(12) United States Patent
Chamoy

(10) Patent No.: US 6,607,373 B2
(45) Date of Patent: Aug. 19, 2003

(54) RESILIENT MOLD FOR TREAD

(75) Inventor: Francois Chamoy, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 94 days.

(21) Appl. No.: 09/956,165

(22) Filed: Sep. 19, 2001

(65) Prior Publication Data

US 2002/0041909 A1 Apr. 11, 2002

Related U.S. Application Data

(63) Continuation of application No. PCT/EP00/02320, filed on Mar. 16, 2000.

(30) Foreign Application Priority Data

Mar. 19, 1999 (FR) .............................................. 99 03500

(51) Int. Cl.⁷ .......................... B29D 30/54; B29C 33/50
(52) U.S. Cl. ............................. 425/20; 425/24; 425/39
(58) Field of Search ............................. 425/20, 24, 39, 425/DIG. 44; 156/95, 96

(56) References Cited

U.S. PATENT DOCUMENTS

| | | | | |
|---|---|---|---|---|
| 2,421,099 A | * | 5/1947 | Vogt .............................. | 425/20 |
| 2,757,702 A | | 8/1956 | Hawkinson ................. | 152/413 |
| 3,614,969 A | | 10/1971 | Breiner ........................ | 144/288 |
| 3,730,801 A | | 5/1973 | Martin ......................... | 156/96 |
| 3,837,385 A | | 9/1974 | Schelkmann ............... | 150/54 B |
| 3,839,123 A | * | 10/1974 | Sausaman ..................... | 425/39 |
| 3,886,028 A | | 5/1975 | Hindin et al. ................ | 156/394 |
| 3,895,985 A | | 7/1975 | Schelkmann ................. | 156/96 |
| 3,947,209 A | * | 3/1976 | Fox ....................... | 425/DIG. 44 |
| 3,983,193 A | | 9/1976 | Wulker et al. ................ | 264/36 |
| 4,013,499 A | | 3/1977 | Benigni ....................... | 156/394 |
| 4,053,265 A | | 10/1977 | Wulker et al. ................ | 425/20 |
| 4,058,422 A | | 11/1977 | Taylor .......................... | 156/96 |
| 4,185,056 A | | 1/1980 | Detwiler ...................... | 264/36 |
| 4,500,375 A | | 2/1985 | Goldstein .................... | 156/96 |
| 4,571,277 A | | 2/1986 | Goldstein .................... | 156/96 |
| 4,767,480 A | | 8/1988 | Goldstein .................... | 156/96 |
| 5,306,130 A | * | 4/1994 | King et al. ................... | 425/20 |
| 5,467,647 A | | 11/1995 | Schepp ........................ | 73/146 |

FOREIGN PATENT DOCUMENTS

| | | |
|---|---|---|
| DE | 1025132 | 12/1955 |
| EP | 0153981 | 9/1985 |

OTHER PUBLICATIONS

U.S. patent application Ser. No. 09/956,154, by Chamoy, filed Sep. 19, 2001.

* cited by examiner

*Primary Examiner*—James P. Mackey
(74) *Attorney, Agent, or Firm*—Baker Botts L.L.P.

(57) ABSTRACT

A resilient annular or ring-shaped mold for molding a crude rubber tread covering a vulcanized tire carcass, the mold being made of a resilient material, characterized in that it has provision for limiting its diameter in compression.

10 Claims, 2 Drawing Sheets

RESILIENT MOLD FOR TREAD

This is a continuation of PCT/EP00/02320, filed Mar. 16, 2000.

BACKGROUND OF THE INVENTION

The invention concerns a resilient mold for treads, designed notably for methods of treading vulcanized tire carcasses. These methods are generally applied today in retreading, but, of course, everything to be stated below is applicable to the treading of new tire carcasses.

There are two main types of retreading methods, one, commonly called "cold retreading," consisting of using a precured tread that is placed on a carcass ready to be retreaded, and then curing the assembly by using heating means such as an oven; the other method, called "hot retreading," consists of placing a crude rubber tread, notably, in the form of sheets, strips or sections, on a carcass ready to be retreaded and then curing the assembly in a mold.

These hot retreading methods are applied, in particular, to the retreading of large-sized tires, such as tires intended for trucks, farm machinery, construction equipment, etc., for which problems of handling and warping of treads render their use difficult in a precured form. The invention lies within the area of hot retreading.

Among the hot retreading methods, U.S. Pat. No. 4,053,265 describes a method which consists of using a resilient ring mold containing lateral wings, preferably made of rubber, designed to make possible the molding and vulcanization of the tread. This resilient mold is placed on the tire carcass to be retreaded, which has been previously covered with a crude rubber tread, the mold-carcass assembly then being totally enveloped by a membrane ensuring tightness. This assembly in then placed in an oven for curing after creation of a vacuum in the membrane.

In order to place the resilient mold on the tread, it is stretched and, maintaining it in a stretched position, the carcass covered with said tread is placed inside and the mold is then left to be compressed on the tread.

In general, for this operation, the tools used grip the wings of the resilient mold, followed by a radial rebound of the latter, resulting in stretching of the entire mold and, therefore, its increase in diameter. However, this operation raises numerous difficulties. In fact, said stretching acts more on the wings and peripheral edges of the mold than on its center zone, which creates a heterogeneous distribution of deformation of the mold and subjects it to intense strains. Furthermore, to enable the central zone of the mold to adopt a diameter greater than that of the crude rubber tread, it is necessary to exert a very considerable stress on the wings of the mold, which can cause the threshold of elasticity of the wings of the mold to be exceeded, give rise to tears and, in addition, not necessarily suffice for the transmission of tensile force on the wings to result in stretching of the center zone of the mold.

This phenomenon also has consequences on the tire itself on mold stripping. In fact, insofar as the center zone of the mold is not directly stretched, there are difficulties of mold stripping in the center of the cured tread. Thus, it is not then possible with this type of mold to carry out the retreading of a tire casing whose H/W shape ratio is high, H being the height of the tire casing mounted on the rim and inflated to its working pressure and W being the maximum width of the casing.

Furthermore, following placement of the tire casing inside the mold, the latter is left to be compressed on the tread, without making it possible to check whether the bottom of the sculpture made in the crude rubber tread leaves a sufficient thickness of rubbery compound in relation to the tire carcass or leaves too great a thickness.

SUMMARY OF THE INVENTION

The invention concerns a resilient mold which makes it possible to overcome these problems.

More particularly, the invention relates to a resilient ring mold designed to ensure the molding of a crude rubber tread covering a vulcanized tire carcass, being made of a rubbery material, in which provision is made for limiting its diameter in compression.

The invention also concerns an apparatus for molding a tread on a tire carcass, comprising a resilient ring mold according to the invention, which also embraces a mounting rim for the tire carcass to be treaded and two resilient flanges intended to cover respectively the outer surface of the tire casing constituted by said carcass and a crude rubber tread covering it, lying between a bead of said casing and the peripheral edge of the corresponding mold.

The choice of radial and axial directions for the retreading means as well as for the tire relates below to the axes generally used as reference in the tire, the axial direction corresponding to a direction parallel to the axis of rotation of the tire casing, and the radial planes being planes containing a radius of the tire casing and passing through said axis of rotation.

Other characteristics and advantages of the invention will appear on reading a working example of a resilient mold according to the invention, with reference to the attached drawings.

DESCRIPTION OF PREFERRED EMBODIMENTS

Figure 2:
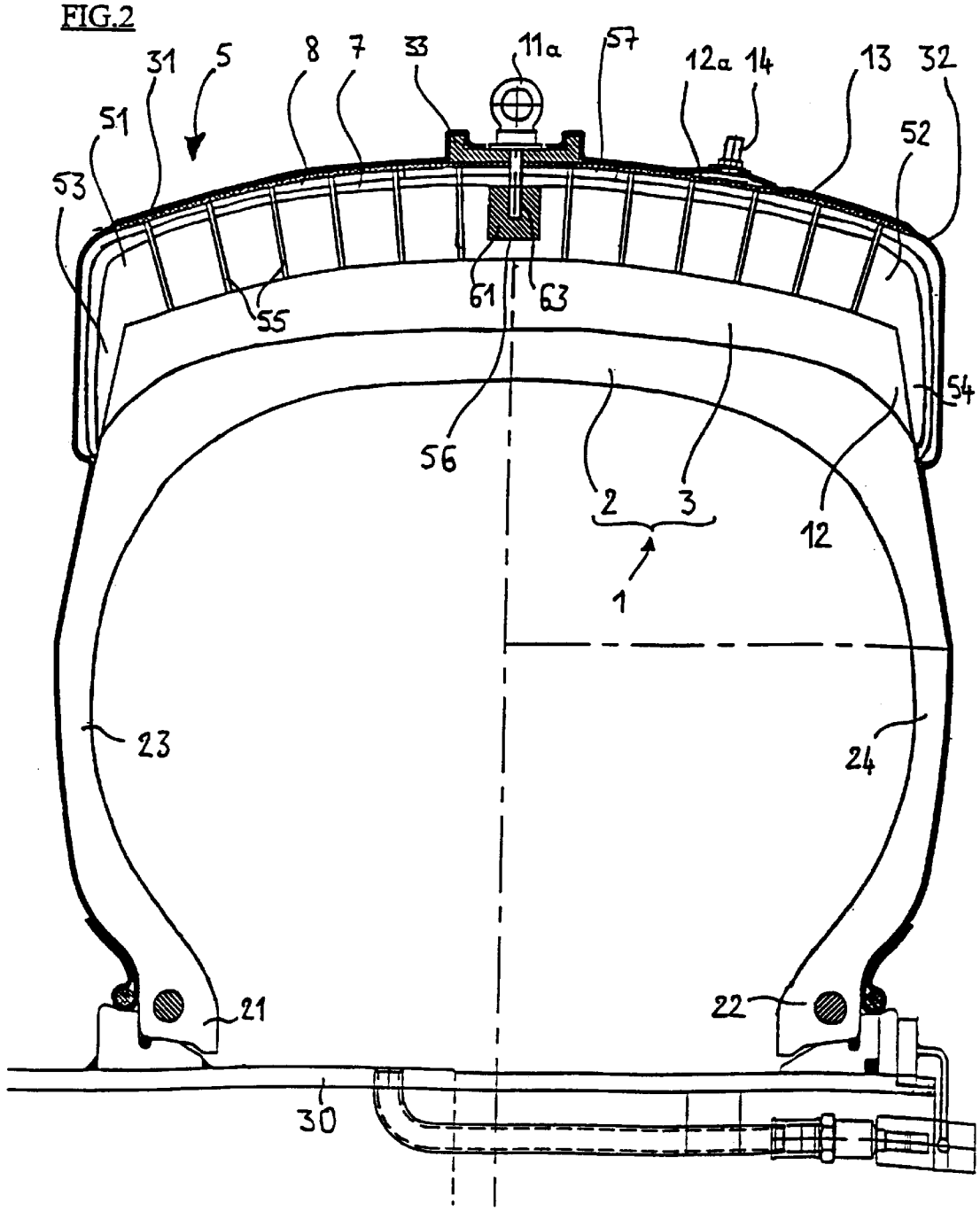
FIG. 2 is a partial radial section of the mold and a tire casing.

According to FIG. 2, a tire casing 1 to be retreaded comprises a carcass 2 containing, notably, two beads 21, 22 and two sidewalls 23, 24 covered with a shouldered crude rubber tread 3, the tread having been deposited on the carcass 2 by any appropriate means; the shoulders 11, 12 of the tread 3 join the crown of said tread to the sidewalls 23, 24.

The resilient mold 5 is shown in the form of a ring, the inner surface of which molds the tread and which possesses annular peripheral edges 51, 52 extended in the form of wings 53, 54 respectively intended to cover the shoulders 11, 12 of the tire casing 1. The crown of the mold 5 is designated 57.

The ring mold 5 must be sufficiently resilient in a direction oriented radially outward and must withstand the vulcanization heat without warping. The mold must also accept undergoing multiple temperature changes and resist tearing. An elastomer appropriate for obtaining the abovementioned properties can, for example, be used to form that ring mold.

Thus, when the mold 5 is stretched, its inner diameter is greater than the outer diameter of the tire casing 1 containing the crude rubber tread 3, which makes possible the placement of the mold 5 on the latter.

Such a mold can be made, for example, according to the method described in U.S. Pat. No. 3,983,193, in which a new tire casing is used as "molding model", which is covered by a vulcanizable crude rubber band. The assembly thus formed is put in an oven, after having been placed under vacuum which is possible due to a membrane surrounding said assembly, for purposes of vulcanization of the mold. The molding pattern appearing on the inner surface of the mold corresponds to the negative tread sculpture of the new tire casing used.

Figure 1:
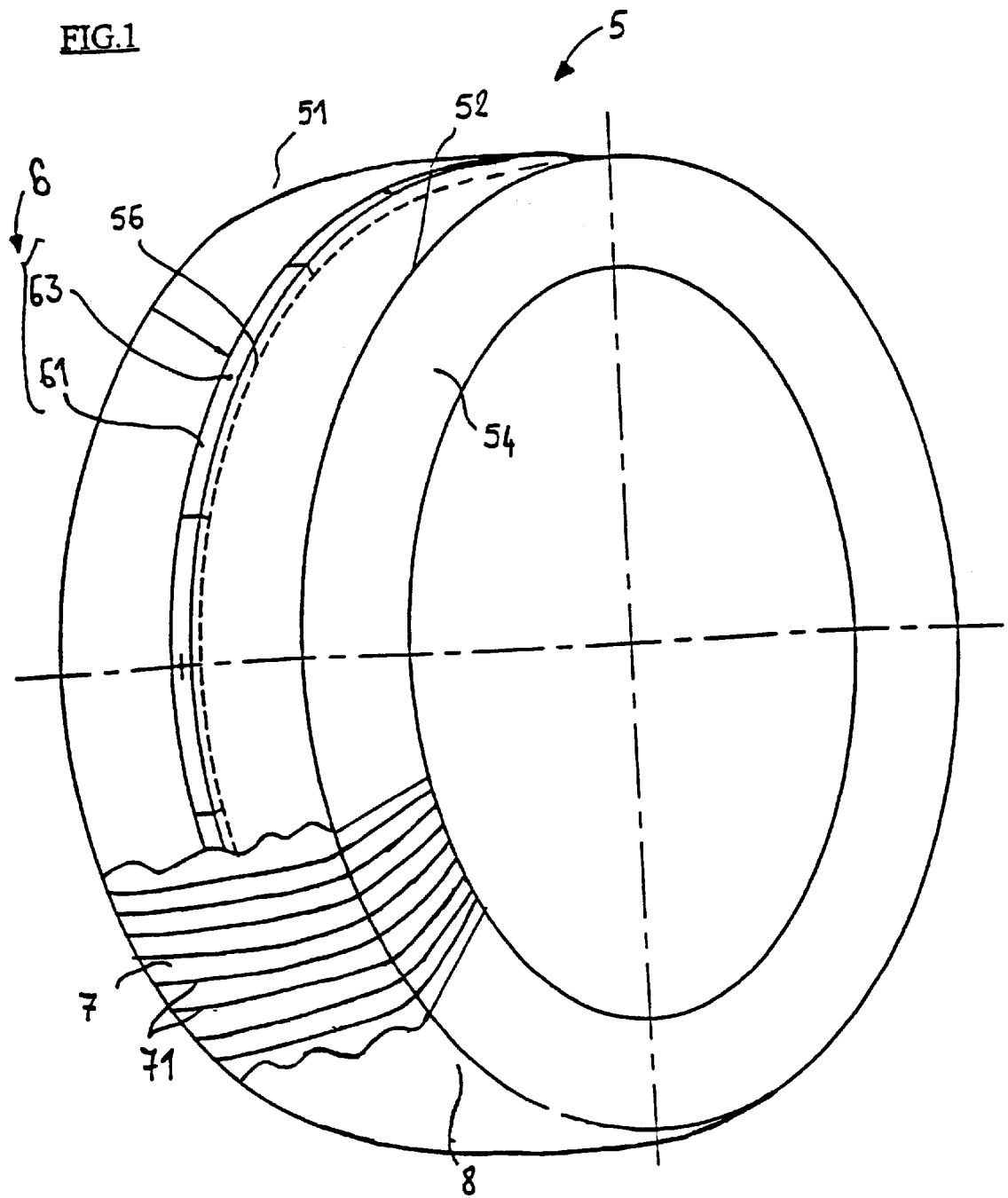
FIG. 1 is a partially sectional perspective of the mold according to the invention.

As FIG. 1 shows, a circumferential groove 56 is machined in the outer surface of the mold, inside which contiguous metal elements 61 are placed in the form of sectors constituting a dimensional metal ring 6 not exceeding the thickness of the outer surface of the mold. These elements 61 are placed juxtaposed and are maintained in the groove 56 by a slight adjustment pressure. The metal elements 61 are dimensioned to fit precisely the size of the groove 56, insofar as their simple placement maintains them in the groove without use of other means of attachment. Thus, these elements 61 may be freely moved circumferentially in their housing (the groove) on extension of the mold, while remaining inside said groove.

The elements 61 are also dimensioned to be contiguous in the rest position of the mold 5, which thus limits to said diameter at rest the possible compression of said mold. In fact, the coefficient of friction between the metal surfaces of the elements 61 and the rubbery surfaces of the groove 56 is such that it prevents the metal elements from coming out of the groove on compression of the mold 5.

In each element 61 of the metal ring 6, a threaded hole 63 has been tapped, which makes possible the subsequent positioning of a tension ring 11a outside the mold 5, as shown in FIG. 2. This tension ring 11a is intended to facilitate stripping the cured tire casing from the mold.

As shown in FIG. 1, the periphery of the mold (including the metal ring 6) is covered with a fabric 7, which can be elastomeric, reinforced by parallel aramide wires 71, and it is deposited on the mold so that the wires are oriented radially. Said fabric 7 ensures that the metal elements 61 stay enclosed in the mold 5, without preventing the elastic extension of the latter. In fact, the wires 71 of the fabric 7, being radial, allow for radial extension of the mold 5.

A second resilient membrane 8 made of rubber is then placed on the outer surface of the mold 5 covered with membrane 7.

The operation can also be repeated several times in order to have several layers of reinforced fabric, depending on the resistances to be obtained. Each reinforced fabric is separated from the following one by an elastic layer of elastomeric material. It is, in fact, the presence of such reinforced fabric or fabrics which makes it possible to withstand the tensile force exerted on the metal elements 61, so that this tension results in an extension of the mold 5 and not in an exit of the elements 61 from the groove 56.

The mold 5 being extracted from its "molding model," it is necessary to bore channels 55 in the mold, these channels extending radially across the thickness of the latter for future use of the mold, in order to allow an evacuation of the air present between the mold and the carcass to be retreaded, covered with a crude rubber tread, during molding and vulcanization of that tread.

According to FIG. 2, the outer circumferential surface of the ring mold 5 is covered by a resilient drain sleeve 12a making possible the evacuation of air through drains, which can be directly deposited on the mold. Said drain sleeve 12a can be integrated with the mold 5. Said sleeve 12a is in turn covered by a resilient membrane 13 with vulcanized elastomeric compound base, a non-return valve 14 being integrated with the resilient membrane 13 in order to allow a vacuum to be created.

Such a mold can be used in retreading means such as described in U.S. Pat. No. 4,053,265. Its use can also be envisaged in other types of retreading means, such as the one represented in FIG. 2.

According to FIG. 2, the retreading means comprises a rim 30 on which the tire casing 1 is to be mounted and inflated, the resilient ring mold 5 for molding the tread 3 and two sleeved resilient flanges 31 and 32 intended to cover the sidewalls of the tire casing 1 and, in part, the crown 57 of the mold 5, in order to ensure tightness of the tire carcass 2, tread 3 and resilient mold 5 assembly. The retreading means positioned on a tire casing is intended to be placed in a heated and pressurized enclosure such as an oven.

In this case, the membrane 13 is replaced by the sleeve-shaped ends of the resilient flanges 31 and 32, and it is then sufficient for one of the flanges to bear the non-return valve 14. In this working variant of the mold, a resilient U-section 33 is placed, hooped on the crown 57 of the mold 5 and held on the center zone of said mold by the tension rings 11a, the wings of that U-section making it possible to hook thereon the flanges 31 and 32. A portion of the drain sleeve 12a is then covered by the U-section 33.

The mold 5 formed thus makes it possible to achieve perfect control of its diameter on compression and to solve the problems of stretching, since it is sufficient to provide, in the tools designed to create tension of the mold 5, for the presence of hooks which cooperate directly with the tension rings 11a and make it possible to stretch the center zone of the mold 5 directly.

I claim:

1. A resilient mold assembly for molding a crude rubber tread covering a vulcanized tire carcass, comprising a ring-shaped mold made of a rubbery material and means for limiting the diameter in compression.

2. A mold assembly according to claim 1, in which the limitation means comprises a circumferential groove in the outer surface of the mold, and metal elements within the circumferential groove and juxtaposed in a rest position of the mold, so that the metal elements form a metal ring.

3. A mold assembly according to claim 2, in which the limitation means are covered by at least one fabric reinforced by radially oriented parallel wires, said fabric covering the entire outer surface of the mold.

4. A mold assembly according to claim 3, in which the reinforced fabric is covered by an elastic layer of elastomeric material.

5. A mold assembly according to claim 2, including a tension ring extending around the mold and in which each metal element has in its center a threaded hole which cooperates with the tension ring.

6. A mold assembly according to claim 5, including a U-section in the center zone of the outer surface secured in position by the tension ring.

7. A mold assembly according to claim 1, in which the outer surface of the mold is covered by a resilient drain sleeve, which, in turn, is covered by a rubbery membrane bearing a non-return vacuum valve.

8. A mold assembly according to claim 7, including a U-section in the center zone of the outer surface of the mold and in which a portion of the drain sleeve is covered by the U-section.

9. Apparatus for molding a crude rubber tread on a vulcanized tire carcass, comprising:

a resilient mold assembly comprising a ring-shaped mold made of a rubbery material and means for limiting the diameter of the mold in comprisession, the limitation means comprising a circumferential groove in the outer surface of the mold and metal elements within the circumferential groove and juxtaposed in a rest position, so that the metal elements form a metal ring;

a mounting rim for said carcass; and two resilient flanges for covering the outer surface of the tire casing constituted by the carcass and a crude rubber tread covering the carcass.

10. A resilient mold assembly for molding a crude rubber tread covering a vulcanized tire carcass, comprising a ring-shaped mold made of a rubbery material and comprising a rigid ring surrounding the ring-shaped mold for permitting limited expansion of the mold in a region in contact with the crude rubber tread while limiting said expansion.

* * * * *